United States Patent Office 3,301,900
Patented Jan. 31, 1967

3,301,900
METHOD OF MANUFACTURING ACRYLAMIDE
Pierre Talet, Alfortville, France, assignor to Nobel-Bozel, Paris, Seine, France, a joint-stock company of France
No Drawing. Filed June 25, 1963, Ser. No. 290,293
Claims priority, application France, June 29, 1962, 902,550
9 Claims. (Cl. 260—561)

It is well known that the manufacture of acrylamide by sulphuric hydrolysis of acrylonitrile is very difficult, especially if it is desired to obtain a pure product with yields which are satisfactory in practice.

In the first place, the known methods necessarily comprise four main operations.

The first operation has for its object the conversion of the acrylonitrile to acrylamide sulphate, by the action of sulphuric acid in an aqueous medium (operation I):

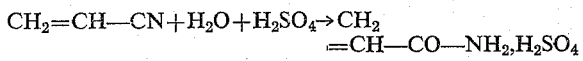

The sulphuric acid is then separated in the form of substantially insoluble sulphate, after neutralization by means of a base such as lime for example (operation II):

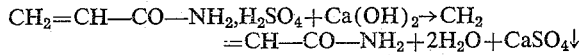

The aqueous solution of acrylamide thus obtained is concentrated until crystallization of the acrylamide (operation III). Finally, the dry acrylamide obtained is purified by re-crystallization in an organic solvent (operation IV).

Not only is this process very complicated, but secondary reactions occur during the operations (I), (II) and (III). On the one hand, it is difficult to stop the hydrolysis at the acrylamide stage; the reaction (I) tends to go further than indicated, with the secondary formation of acrylic acid. On the other hand, the double bond of the acrylamide, which is activated by a carbonyl group in the alpha position, is extremely reactive and thus it tends to fix by addition the sulphuric acid used for the hydrolysis; in addition, the acrylamide has a strong tendency to polymerize, especially during the concentration operation (III).

The method of the present invention makes it possible to simplify the operations, to eliminate the secondary reactions to a very great extent and at the same time to directly obtain a very pure acrylamide with a high yield.

More precisely, the invention is a method of manufacture of acrylamide by sulphuric hydrolysis of acrylonitrile, followed, after neutralization by means of a base, by the separation of the sulphuric acid in the form of an almost insoluble sulphate, the method being characterized in that the hydrolysis and the neutralization are effected in the presence of a solvent which is not miscible with water and which does not dissolve acrylamide at ordinary temperatures but which is a solvent of acrylamide when hot, so that the mixture is heated during or after neutralization to a temperature sufficient to effect an extraction of the acrylamide by means of the said solvent, and in that the separation of crystals of very pure acrylamide is then obtained by simple cooling.

The solvents complying with above-specified conditions belong especially to the family of the benzene hydrocarbons; for example benzene and toluene give very satisfactory results.

In carrying out the process a hydrocarbon solvent of the kind specified is added to one or more of the reagents during the operations of manufacture of acrylamide. The total quantity of solvent to be utilized is at least one part by weight to one part of acrylic nitrile, the optimum proportion being generally comprised between 6 and 12 parts of solvent for each part of acrylonitrile.

In a preferred method of procedure, a fraction of the hydrocarbon solvent, for example one-half, is added to the solution of sulphuric acid intended for the hydrolysis of the acrylonitrile. The acrylonitrile is then added and hydrolysis is effected by heating to 80–100° C. The solution is then cooled to 20–60° C., and then neutralized, for example with calcium carbonate, the neutralizing agent being added in the form of a dispersion in the remaining fraction of solvent; the temperature of the medium is brought up at the same time to 90–100° C. in order to induce the dissolution in the solvent of the acrylamide liberated. The hot organic layer is then separated, and this on cooling allows pure acrylamide to crystallize. The solvent recovered after crystallization is re-cycled for a further extraction.

It has been surprising to find that the presence of the said solvent in the reaction medium eliminates secondary reactions. It may be supposed—but the invention is not in any way dependent on these explanations—that the presence of the solvent of the invention avoids overheating; on the other hand, as the reactions are slowed-down because the operation takes place in a heterogeneous medium, the control of temperature is easier.

The most remarkable fact, both practically and theoretically, is that the utilization of the solvents of the invention makes it possible to wholly eliminate the distillations which are habitually necessary in the known methods. In view of the very high solubility of acrylamide in water (140 grams for 100 grams of water at 20° C.), it was entirely surprising and unforeseen that with a solvent such as benzene for example, it was possible to extract acrylamide from its dilute aqueous solutions, without the necessity of previously concentrating these aqueous solutions. From the practical standpoint, the elimination of these concentration operations represents an important technical advance. Furthermore, it appears obvious that this simplification of the operations is also one of the important reasons for the lack of secondary reactions.

As a further precaution in order to further inhibit polymerization a polymerization inhibitor such as a soluble copper salt, etc. may be added.

Conversely, without departing from the scope of the invention, all the solvents may be added after the hydrolysis operation, e.g. only before the neutralization operation.

Finally, the reactions may be carried out in the presence of a first solvent such as toluene and the extractions may then be continued with a second solvent such as benzene.

In order to provide a better understanding of the invention, two examples of its execution will be given below by way of indication but without any limitative restriction. The "parts" indicated are parts by weight.

Example 1

A mixture of 700 parts of benzene, 300 parts of 93% sulphuric acid, 40 parts of water and 0.3 part of powdered copper are heated to 60–70° C. with reflux. After the heating is stopped, 159 parts of acrylonitrile are introduced into the mixture, with powerful stirring, over about 50 minutes.

The temperature rises slowly to 100° C. The heating is continued for 1 hour at 100° C. and the mixture is then cooled to 25° C. (Analysing for acrylamide by neutralizing and diluting with water, a yield of acrylamide is obtained at least equal to 90% with respect to the nitrile.)

The product obtained containing acrylamide sulphate is poured while stirring strongly into 700 parts of benzene containing in suspension 300 parts of calcium carbonate. The mixture is then gradually heated to boiling with reflux; in this way, the neutralization is carried out gradually and the acrylamide produced is dissolved in the hot state in benzene.

The hot benzene layer is drawn-off and during cooling allows the acrylamide to crystallize in the form of pure white flake crystals. The solution is filtered under vacuum and the benzene is re-cycled for a further extraction process.

The product obtained is pure acrylamide having a melting point of 85° C.

The cake may, if so required, be re-treated with the benzene obtained from the first filtration and re-passed over the filter. This operation can be repeated several times if necessary.

Example 2

A mixture of 300 parts of toluene, 100 parts of 99% sulphuric acid, 20 parts of water and 0.2 part of powdered copper is heated to 60° C. After the heating is stopped, 53 parts of acrylonitrile are introduced into this mixture over about 1 hour with powerful stirring.

The temperature rises slowly to 100° C. The heating is continued for 1 hour at 100° C. and the mixture is then cooled to 60° C. There is then slowly added a dispersion of 100 parts of calcium carbonate in 300 parts of toluene in order to effect neutralization.

Finally, the mixture is heated to 90–100° C. for about 10 minutes in order to complete the solution of the acrylamide obtained in the toluene.

The hot toluene layer is drawn-off and when cooled allows very pure acrylamide to crystallize out (melting point=85° C.).

The residual product of the extractions, solid in the cold state, still contains acrylamide. The extraction of this may be continued in order to isolate further quantities of the crystallized product. It may also be treated with water in order to obtain an aqueous solution of acrylamide which can be employed directly for the purposes of polymerization or for commercial co-polymerizations.

In these examples, there is generally an advantage to be obtained in limiting the process to a single extraction of acrylamide, and in utilizing the residual product directly for the purposes indicated above. Overall, the yield of acrylamide, calculated with respect to the nitrile employed, is of the order of 75%.

I claim:

1. In the manufacture of acrylamide comprising hydrolizing acrylonitrile with sulphuric acid, neutralizing the reaction product with a base and forming an insoluble sulphate, separating the insoluble sulphate, concentrating the aqueous solution to crystallize the acrylamide formed, and purifying the crystals of acrylamide, the improvement comprising adding a hydrocarbon to the reaction medium during the hydrolysis stage, said hydrocarbon being non-miscible with water and capable of dissolving acrylamide, heating the hydrocarbon containing reaction medium, separating the hydrocarbon phase, and recovering from said hydrocarbon phase the acrylamide crystals, whereby pure crystals of acrylamide are obtained directly, with yields of at least 75% with respect to the nitrile initially employed.

2. An improvement as claimed in claim 1, in which said hydrocarbon is selected from the group consisting of benzene and toluene.

3. An improvement as claimed in claim 1, in which the reaction medium comprises a polymerization inhibitor for the acrylamide.

4. In the manufacture of acrylamide comprising hydrolyzing acrylonitrile with sulphuric acid, neutralizing the reaction product with a base and forming an insoluble sulphate, separating the insoluble sulphate, concentrating the aqueous solution to crystallize the acrylamide formed, and purifying the acrylamide crystals, the improvement comprising hydrolyzing the acrylonitrile with sulphuric acid in the presence of a hydrocarbon which is non-miscible with water and is capable of dissolving acrylamide, adding a neutralizing agent for the sulphuric acid to form a substantially insoluble sulphate, heating the reaction medium, separating the hot hydrocarbon phase, cooling said hydrocarbon phase, and crystallizing the acrylamide formed from said hydrocarbon phase, and recovering the pure acrylamide.

5. In the manufacture of acrylamide comprising hydrolyzing acrylonitrile with sulphuric acid, neutralizing the reaction medium with a base, separating the sulphuric acid in the form of an insoluble sulphate from the neutralized reaction medium, concentrating the aqueous solution for crystallization of the acrylamide formed, and purifying said acrylamide crystals, the improvement comprising forming a mixture of sulphuric acid and a hydrocarbon selected from the group consisting of benzene and toluene, adding acrylonitrile, heating the reaction medium to between 80 and 100° C., cooling to between 20 and 60° C., adding a neutralizing agent for the sulphuric acid to form a substantially insoluble sulphate salt, said neutralizing agent being dispersed in a hydrocarbon selected from the group consisting of benzene and toluene, heating the reaction medium to between 90 and 100° C., separating the hot hydrocarbon phase, cooling and crystallizing the acrylamide formed from said hydrocarbon phase, and recovering the pure acrylamide produced.

6. In the manufacture of acrylamide comprising hydrolyzing acrylonitrile with sulphuric acid, neutralizing the reaction medium with a base, separating the insoluble sulphate from the neutralized reaction medium, concentrating the resultant aqueous solution for crystallization of the acrylamide formed, and purifying said acrylamide crystals, the improvement comprising hydrolyzing acrylonitrile with sulphuric acid in the presence of a quantity of at least one part by weight of hydrocarbon for one part by weight of acrylonitrile, said hydrocarbon being selected from the group consisting of benzene and toluene, adding a neutralizing agent for the sulphuric acid so as to form a substantially insoluble sulphate, heating the reaction medium, separating the hydrocarbon phase, cooling, crystallizing the acrylamide formed from said hydrocarbon phase, and recovering the pure acrylamide produced.

7. An improvement as claimed in claim 6, in which only a fraction of the total proportion of the hydrocarbon used in the process is used in the hydrolysis and the remainder is added in the neutralizing reaction of the sulphuric acid.

8. An improvement as claimed in claim 6, in which the proportion of the hydrocarbon is within the range of 6 to 12 parts by weight of hydrocarbon for one part by weight of acrylonitrile.

9. In the manufacture of acrylamide comprising hydrolyzing acrylonitrile with sulphuric acid, neutralizing the reaction medium with a base, separating the sulphuric acid in the form of an insoluble sulphate, concentrating the aqueous solution to crystallize the acrylamide formed, and purifying said acrylamide crystals, the improvement comprising adding a hydrocarbon non-miscible with water and capable of dissolving acrylamide to the reaction medium during hydrolysis, heating the hydrocarbon containing reaction medium, separating the hydrocarbon phase and recovering from said phase the acrylamide crystals, whereby pure crystals of acrylamide are directly obtained with yields of at least 75% with respect to the nitrile initially employed, the hydrocarbon freed from acrylamide being re-cycled into the process.

References Cited by the Examiner

UNITED STATES PATENTS

| | | | |
|---|---|---|---|
| 2,628,977 | 2/1953 | Grigsby | 260—561 |
| 3,008,990 | 11/1961 | Weiss | 260—561 |
| 3,166,588 | 1/1965 | Johnson | 260—561 |

FOREIGN PATENTS 641,287  5/1962  Canada.

WALTER A. MODANCE, *Primary Examiner.*

NICHOLAS S. RIZZO, *Examiner.*

R. PRICE, N. TROUSOF, *Assistant Examiners.*